United States Patent

[11] 3,588,330

[72] Inventors John H. Clark
55 Elchester Drive, East Northport, N.Y. 11731;
Rene C. Bache, 307 Emerson St., Port Jefferson, N.Y. 11777

[21] Appl. No. 701,511
[22] Filed Dec. 21, 1967
[45] Patented June 28, 1971

[54] FACSIMILE SIGNAL MODIFICATION REDUCING THE INFORMATION CHANNEL BANDWIDTH
4 Claims, 11 Drawing Figs.

[52] U.S. Cl. .......... 178/6
[51] Int. Cl. .......... H04n 1/20
[50] Field of Search .......... 178/6 (BWR); 325/38 (A)

[56] References Cited

UNITED STATES PATENTS 3,233,236 2/1966 Katzenstein et al. .......... 325/38A

*Primary Examiner*—Robert I. Griffin
*Assistant Examiner*—Barry Leibowitz
*Attorney*—Alfred W. Barber ABSTRACT: It has been found that typical facsimile signals derived from scanning black copy on a white background can be processed in such a way as to substantially reduce the communication channel bandwidth required to transmit a given amount of information. In the typical system to be described the bandwidth is reduced by a factor of two to one. Pulses of modulated subcarrier from a facsimile scanner are processed to form a three level signal having one-half the repetition rate or frequency of the original signals and hence one-half the frequency bandwidth. These reduced bandwidth signals are transmitted over the communication channel. At the receiving end the reduced bandwidth signals are processed to restore their original form and are then applied to a facsimile recorder. This invention permits either twice the information to be sent over a given channel of restricted bandwidth or to send the same amount of information over a channel having one-half the bandwidth.

FIG I

INVENTOR.
JOHN H. CLARK
RENE C. BACHE
BY
Alfred W. Barber
ATTORNEY

INVENTOR.
JOHN H. CLARK
RENE C. BACHE
BY
Alfred W. Barber
ATTORNEY

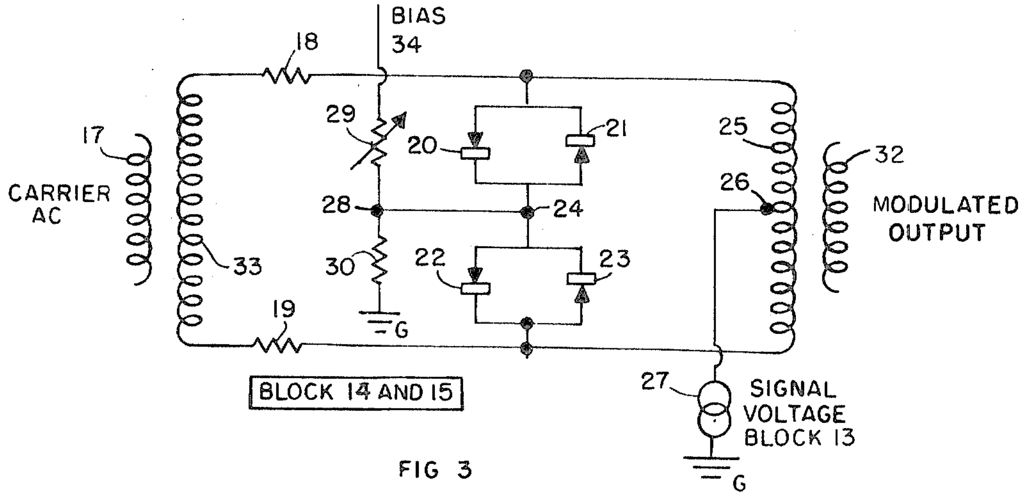
FIG 3
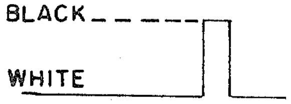
FIG 4
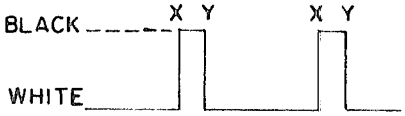
FIG 5
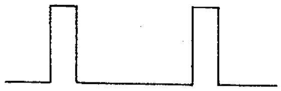
FIG 8
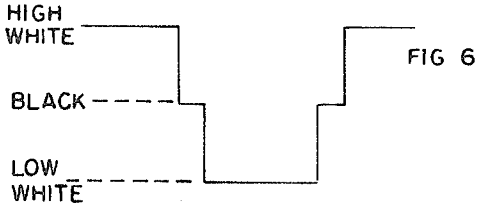
FIG 6
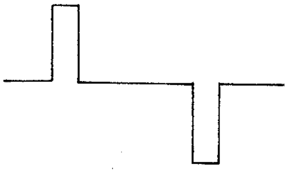
FIG 9
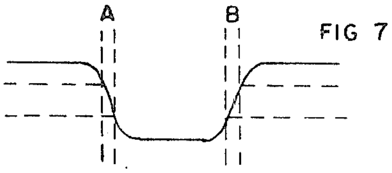
FIG 7
FIG 10
INVENTORS
JOHN H. CLARK
RENE C. BACHE
BY
Alfred W. Barber
ATTORNEY INVENTORS
JOHN H. CLARK
RENE C. BACHE
BY
Alfred W. Barber
ATTORNEY

FACSIMILE SIGNAL MODIFICATION REDUCING THE INFORMATION CHANNEL BANDWIDTH

BACKGROUND OF THE INVENTION

1. Field of the Invention

The present invention may be considered as falling in Class 178, Telegraphy and either subclass 5, Facsimile or subclass 43.5, Transmission of variable voltage via pulse modulation (e.g. code modulation, pulse-width modulation).

2. Description of Prior Art

Facsimile signal generated by scanning black copy against a white background are used to modulate a subcarrier resulting in bursts of subcarrier signals. These latter signals are transmitted over a communication channel to a receiver at a remote point where they are used to actuate a facsimile recorder to reproduce a facsimile of the original copy. When the communication channel has a restricted bandwidth the detail which can be conveyed depends on the scanning rate and this bandwidth. REducing the scanning rate in order to provide greater detail reduces the rate at which information is conveyed over the channel. In accordance with the present invention a two-to-one improvement in detail or scanning rate can be provided over a given bandwidth communication channel.

SUMMARY

In accordance with the present invention modulated subcarrier signals from a facsimile scanner are processed to form three level signals of one-half the repetition rate of the original signals but containing substantially the same amount of information and requiring only one-half the bandwidth in the communication channel. Either low scanning rate, high detail signals or high scanning rate lower detail signals can be utilized in the system to take advantage of the reduction in bandwidth.

BRIEF DESCRIPTION OF THE DRAWING

FIG. 3 is a schematic circuit diagram of an improved doubling network suitable for use as block 14 and 15 combined in FIG. 2.

FIGS. 4 through 10 are graphical representations of various signal forms useful in explaining the theory and mode of operation of the present invention.

FIG. 1, the block diagram of the transmission system starts with block 1 which may be taken to represent a typical facsimile scanner for scanning block copy against a white background and including an amplitude modulated subcarrier. Thus, the upper waveforms shown between blocks 1 and 2 are typical of the four bursts of subcarrier signal that would be produced by scanning four equally spaced black lines of width equal to the spaces and polled so that black represents maximum signal and white represents no signal or the zero axis. The lower waveforms are typical of high speed scanning of the same subject matter showing a rounding of the waveform due to inability of the facsimile scanner amplifier and modulator to follow the higher rates of change involved.

Figure 1:
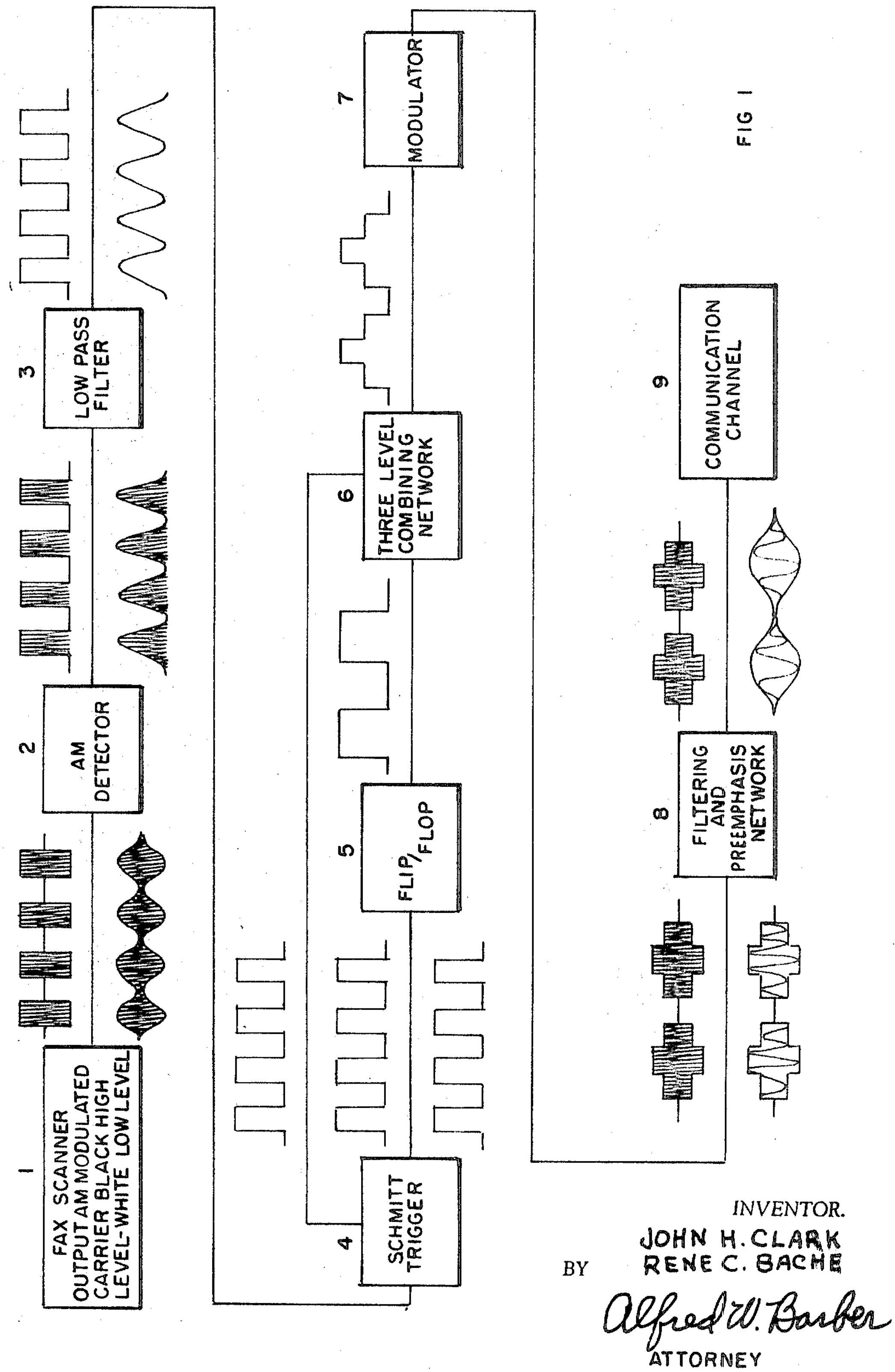
FIG. 1 is a block diagram of one form of facsimile transmission system in accordance with the present invention including representations of typical wave-forms at each block.

Block 2 represents an amplitude modulating detector which in effect shifts the zero axis to the lower side of both the upper (low scanning speed) and the lower (high scanning speed) waveforms.

Block 3 represents a low pass filter which merely removes the subcarrier from the waves without substantially affecting there forms as shown between blocks 3 and 4.

Block 4 represents a Schmitt trigger for providing squared constant amplitude pulses for both the low and high scanning speed signals as shown by the upper and lower row waveforms between blocks 4 and 5.

Block 5 represents a flip-flop which changes its state in response to a transition of its input signal. This could be either the transition from zero to maximum or from maximum to zero. In the drawing as shown the flip-flop changes state in response to the change of its input signal from zero to maximum. It will be seen that this response in effect halves the pulse frequency so that the output pulses from block 5 have half the repetition rate of the input pulses as shown by the waveforms between blocks 5 and 6.

Block 6 represents a three level combining network receiving an input as shown directly from the Schmitt trigger of block 4 and the half frequency pulses from the flip-flop of block 5. The signals thus combines produce the three level signals as represented by the waveforms shown between blocks 6 and 7. These three level signals will be seen to have the half repetition rate characteristic but include three levels comprising zero, half value and maximum value.

The three level combining network 6 may be illustrated as follows: Imagine the square waves coming from the Schmitt trigger as waves having two states, either 0 volts when the facsimile machine scans white or 3 volts when the facsimile machine scans black. The flip-flop output has two states, either 0 volts or 6 volts depending upon the sequence of black input pulses. The network is arranged so that when black is present, the Schmitt trigger output of 3 volts closes a gate which prevents output of either 0 or 6 volts from the flip-flop from appearing at the output of the network. The Schmitt trigger output of 3 volts is, however, passed to the network output. When scanning white, the Schmitt trigger has 0 volts output and this causes a gate to open which allows the flip-flop output of either 0 or 6 volts to appear at the network output. This gives rise to the three level output as shown. Between blocks 5 and 7 the waveshapes are the same for either high speed or low speed keying, except for the time axis.

In the three level signal all of the information of the original signals is contained but at half the repetition rate so that the bandwidth is effectively cut in half. It will be seen from an inspection of the waveform shown between blocks 6 and 7 that the median signal levels represent and correspond in time with the signals representing black in the original signal and that the maximum and minimum values both represent white in the original signal. In this way a signal has been created without loss of information but having one-half the bandwidth and hence requiring only one-half the width of communication channel formerly required.

It will be understood that the present invention applies equally to reverse conditions i.e. black may be substituted for white and white for black in all steps and combinations although the more general system will scan black copy on a white background.

Block 7 represents a modulator where a carrier suitable for the communication channel involved is modulated by the three level DC signal.

Block 8 represents a filter and preemphasis network the exact characteristics of which depend on the type of communication channel to be used. Normally vestigal sideband modes will be used and the filter characteristic is adjusted to maintain approximately constant modulation depth with keying rates.

Block 9 represents a filter for removing unwanted frequency components such as out-of-band noise, cross-talk or other disturbances. This block may also be considered the terminal for the communication channel at the transmission end of the system. As has been stated above, this three level signal while containing the information of the original signal, requires only one-half the bandwidth for transmission over a communication channel.

Figure 2:
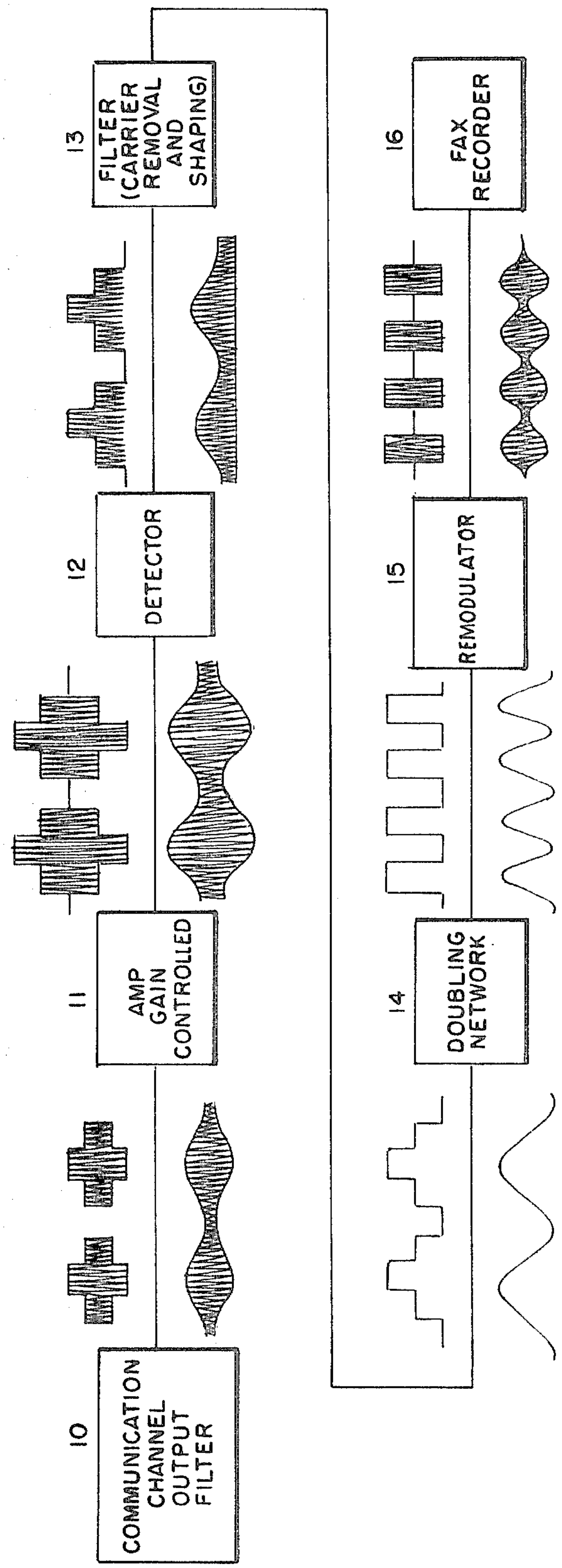
FIG. 2 is a block diagram of one form of facsimile receiving system in accordance with the present invention including representations of typical wave-forms at each block.

FIG. 2 is a receiver in block diagram form which is suitable for receiving the three level signal from the communication channel and for reconstructing the signal in its original form for recording by means of a conventional facsimile recorder.

Block 10 represents a communication channel coupling device such as a band-pass filter for selecting the desired channel. The three level signals transmitted from block 9 of FIG. 1 are received in block 10 and appear at its output in the forms shown between blocks 10 and 11, the upper diagram representing signal resulting from slow speed scanning and the lower representing the signal resulting from high speed scanning.

Block 11 represents an automatic gain controlled amplifier for bringing all signals to substantially the same amplitude. This step is generally necessary due to the variable attenuation characteristics of most communications channels.

Block 12 represents an amplitude modulation full-wave detector which in effect cuts off the lower part of the signal resulting in the waveforms shown between blocks 12 and 13.

Block 13 is a filter for removing the carrier and shaping the wave so that it will have the forms shown between blocks 13 and 14. This is a positive and negative limiter comprising two threshold detectors which slice at points equally above and below the median level and only voltages between the two thresholds are passed on.

Block 14 is a doubler which produces the double rate signals as shown between blocks 14 and 15.

Block 15 is a modulator which remodulates the signals with a subcarrier resulting in the signals as shown between blocks 15 and 16. It will be seen now that the signals have been reconstructed to have substantially their original form (see signals between blocks 1 and 2 in FIG. 1) and are hence suitable for application to a conventional facsimile recorder as represented by block 16.

Figure 11:
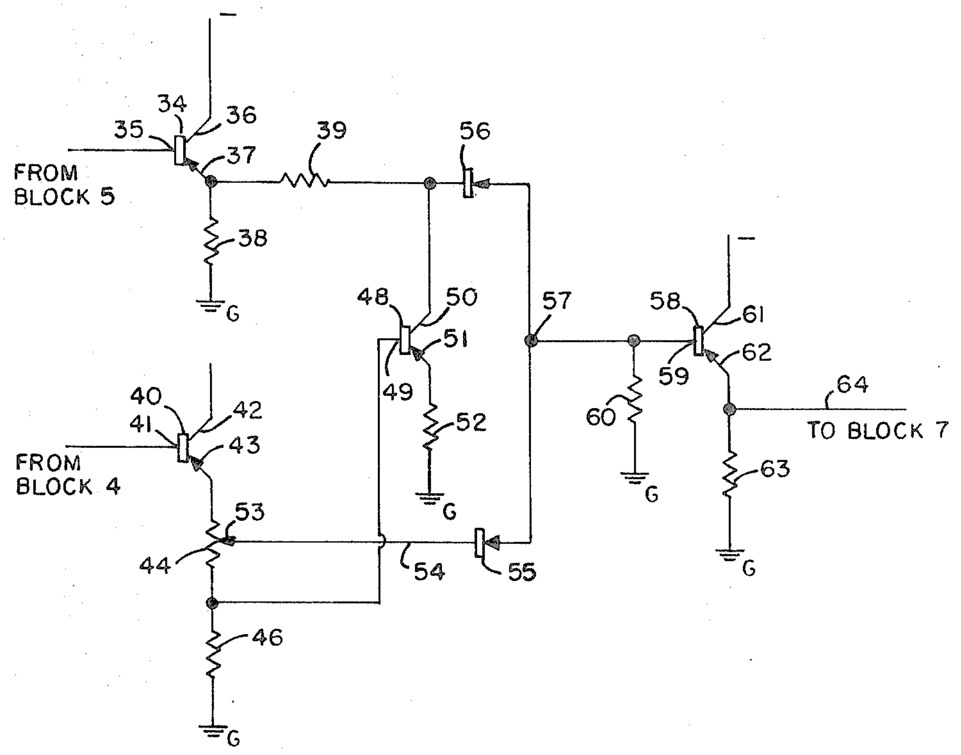
FIG. 11 is a schematic circuit diagram of an improved three level combining network suitable for use as block 6 in FIG. 1.

While the present invention can be carried out using functional blocks in accordance with standard practices as described above, improved operation can be attained with the improved circuits shown in FIGS. 3 and 11. In addition additional understanding can be gained as to the theory of operation from FIGS. 4 through 10 as described below.

FIG. 3 is a circuit which combines the functions of blocks 14 and 15 of FIG. 2. A carrier to be modulated is applied, from a suitable source not shown, to primary 17 of input transformer 17—33. The secondary voltage is applied through resistors 18 and 19 across two pairs of back-to-back diodes 20—21 and 22—23 and to primary 25 of output transformer 25—32. The modulating signal 27 (representing block 13 of FIG. 2) is applied to the center tap 26 of primary 25. The two diode pairs act as shunt modulators. In order to convert the three level signal to a modulated double frequency signal, a bias is applied form a suitable bias source 34 through a variable resistor 29 and a fixed resistor 30 so chosen that the bias applied from junction 28 to junction 24 can be adjusted to provide 0 voltage difference between the static bias and the median signal level. The result is that no current flows through the diode shunt gates making the diodes open circuits for the carrier and no attenuation takes place between secondary 33 and primary 25. This then provides the maximum output levels. However, signal levels above and below the median cause current to flow in the diodes lowering their impedances and attenuating the carrier. Thus, minimum output carrier is produced for both maximum and minimum values of the 3 level signal completing the conversion form the 3 level signal to the pulses of modulated carrier at double frequency. It will be seen that this latter is a complete reconstruction of the original signal from block 1 and hence can be applied to a facsimile scanner 16 to reproduce the original copy.

FIG. 11 shows an improved circuit for block 6 for producing the 3 level signal from signals from Schmitt trigger 4 and flip-flop 5. The flip-flop output of either 6 volts or 0 volts is applied to base 35 of transistor 34. Transistor 34 has a collector 36 connected to a suitable source of bias, not shown, and an emitter 37 returned to ground through emitter resistor 38. The emitter signal is applied through resistor 39 and diode 56 to a signal combining junction point 57. The Schmitt trigger output from block 4 consisting of signals, 6 volts for black and 0 volts for white is applied to base 41 of transistor 40. Collector 42 is connected to a suitable source of bias, not shown, and emitter is returned to ground G through potentiometer 44 and resistor 46 connected in series at junction 45. The resulting signal at junction 45 is applied over lead 47 to base 49 of transistor 48 so that collector 50 connected between resistor 39 and diode 56 shunts the circuit when base 49 receives a forward bias. Emitter 51 is returned to ground G through resistor 52. Signals at adjustable contact 53 on potentiometer 44 are applied over lead 54 and through diode 55 to combining junction point 57. Adjustable contact 53 is varied until the black signal is precisely midway between the maximum and minimum flip-flop voltages. The resulting three level signal at junction point 57 is applied to base 59 of transistor 58 across base resistor 60. Collector 61 is returned to a source of suitable bias, not shown, and emitter 62 is returned to ground G through resistor 63. The output to block 7 is taken from emitter 62 over lead 64.

The present invention is unique in that it recognizes the inherent dissymmetry in usual black and white facsimile material, i.e. letters, weather maps, drawings, etc. The waveshapes shown to illustrate the functions of the blocks in the block diagrams (FIGS. 1 and 2) were based on a series of equally spaced black and white lines of equal thickness. However, the preponderance of keying with black/white material consists of black lines against a relatively long base of white as illustrated in FIG. 4. The system in accordance with the present invention recognizes this as effectively a series of white to white transitions and accordingly makes black the middle level and white alternately higher and lower making it possible to send twice the information rate for such material. It would also be possible if the situation were reversed and white lines against a black background were represented by a white median level with black alternately higher and lower. The following will serve to illustrate the point.

Take two thin black lines against a white background which when scanned will produce an output as shown in FIG. 5. This output when passed through the circuits in accordance with the present invention is converted to the three level signal shown in FIG. 6. If this three level signal is sent over a communications channel just inadequate to pass a pulse of width XY (FIG. 5) the channel will easily pass the signal of FIG. 6 producing at the other end of the channel a wave of the form shown in FIG. 7 having an effective pulse width A–B, much longer then X–Y. The receiver circuitry (FIG. 2) recovers the two pulses of the original signal by detecting crossings of the median value and producing the restored signal as shown in FIG. 8.

Now, consider the case where this three level system is used but with the median level representing white and the alternate higher and lower levels representing black. Again starting with two narrow black pulses (FIG. 5) just narrow enough so that for an on/off or two level system they cannot be passed over the channel bandwidth available. The receiver of the present invention will transform the two level signals to the form shown in FIG. 9. The pulse width is essentially unchanged and accordingly the channel does not pass the information giving only a constant output as shown in FIG. 10. Interpretation of the input information is obviously impossible from this constant output.

To summarize, the system in accordance with the present invention easily passes twice the information rate of ordinary on/off systems or a three level system arranged in the opposite manner (FIGS. 8, 9 and 10 ). The present invention provides the double information rate for the great preponderance of black/white material encountered in the business world an will handle either white to white transitions or repetitive black-white-black-white symmetrical patterns at twice the information rate and will still handle black to black transitions at a rate equal to a 2 level system. It has been found in numerous tests that few black to black transitions are present in most copy as they usually go unnoticed in test material.

While only one form of the present invention has been shown and described many modifications will be apparent to those skilled in the art and within the spirit an scope of the invention as set forth, in particular, in the appended claims.

We claim:

1. In a facsimile signal system for providing electrical signals representing copy to be transmitted against a contrasting background, wherein said copy occupies a relatively small area when compared with said background area and wherein said copy comprises a substantial amount of fine line detail to be transmitted, and said signals are unsymmetrical to a substantial degree as a result of said copy and background relative areas, the combination of;

facsimile scanner means for providing signal pulses of substantially constant amplitude rising form substantially constant reference level in response to black copy on a white background;

means for converting said signal pulses and reference level to a 3 level signal wherein said signal pulses provide the midlevel portions and said reference level is converted alternately to the remaining 2 levels contiguous with said midlevel portions; (and means for emitting said modulated carrier of a remote point), and and means for utilizing said 3 level signal.

2. In a facsimile signal system for providing electrical signals representing copy to be transmitted against a contrasting background, wherein said copy occupies a relatively small area when compared with said background area and wherein said copy comprises a substantial amount of fine line detail to be transmitted, and said signals are unsymmetrical to a substantial degree as a result of said copy and background relative areas, the combination of;

facsimile scanner means for providing signal pulses of substantially constant amplitude rising from a substantially constant reference level in response to white copy on a black background;

means for converting said signal pulses and reference level to a 3 level signal wherein said signal pulses provide the midlevel portions and said reference level is converted alternately to the remaining 2 levels contiguous with said midlevel portions; and and means for utilizing said three level signal.

3. In a facsimile signal system for providing electrical signals representing copy to be transmitted against a contrasting background, wherein said copy occupies a relatively small area when compared with said background area and wherein said copy comprises a substantial amount of fine line detail to be transmitted, and said signals are unsymmetrical to a substantial degree as a result of said copy and background relative areas, the combination of;

facsimile scanner means for providing signal pulses of substantially constant amplitude rising from a substantially constant reference level in response to copy to be reproduced against a contrasting background, wherein said reference level is in accordance with said background;

means for converting said signal pulses and reference level to a 3 level signal wherein said signal pulses provide the midlevel portions and said reference level is converted alternately to the remaining 2 levels contiguous with said midlevel portions; and and means for utilizing said 3 level signal.

4. In a facsimile signal system wherein the facsimile copy comprises copy to be transmitted and a contrasting background, said copy occupying a relatively small portion of the background and when scanned providing a signal of substantial dissymmetry with respect to background level, the combination of;

facsimile copy scanning means for providing signal pulses in accordance with scanned copy and background material;

Schmitt trigger means coupled to said scanning means for providing substantially constant amplitude pulses in synchronism with said signal pulses;

flip-flop means coupled to said Schmitt trigger for providing constant amplitude pulses of substantially twice the amplitude of the first said constant amplitude pulses and of half the repetition rate thereof and triggered thereby;

means for gating said double amplitude pulses off during any on period of the first said pulses;

means for combining the first said constant amplitude pulses to provide a 3 level signal; and and means for utilizing said 3 level signal for transmitting information representing said facsimile copy whereby said 3 level signal exhibits a maximum level, a minimum level and an intermediate level and said intermediate level is in accordance with said copy and said maximum and minimum levels are in accordance with said background material of said facsimile copy.